Dec. 5, 1950          H. J. HORNER          2,532,915
METHOD AND APPARATUS FOR DETERMINING
MALPOSITION OF VERTEBRAE
Filed Jan. 11, 1949
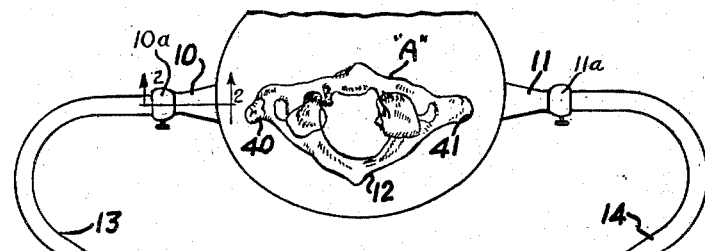
FIG. 1
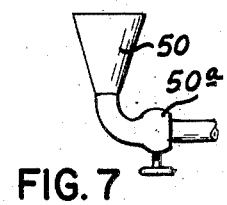
FIG. 7
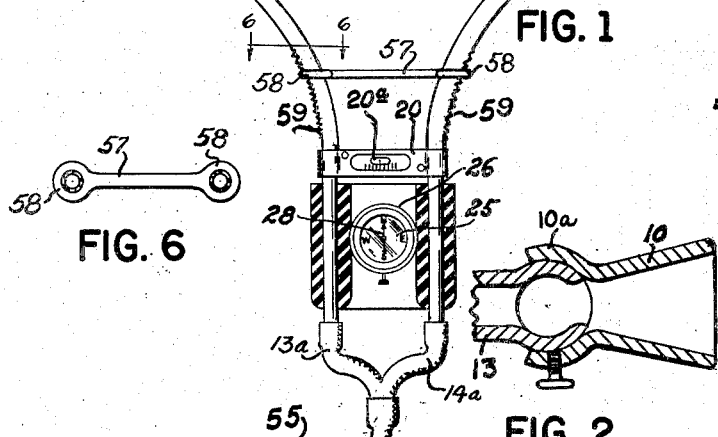
FIG. 6      FIG. 2
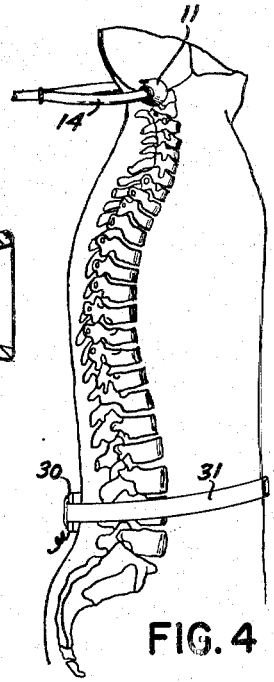
FIG. 4
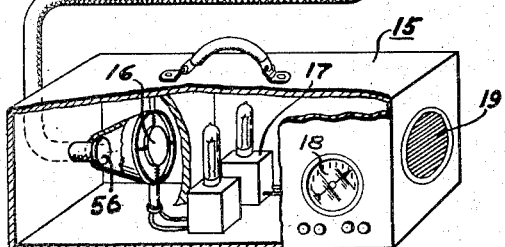
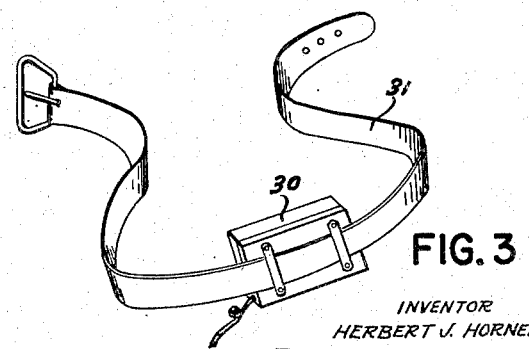
FIG. 5      FIG. 3
INVENTOR
HERBERT J. HORNER
By Toulmin & Toulmin
ATTORNEYS Patented Dec. 5, 1950

2,532,915

UNITED STATES PATENT OFFICE 2,532,915

METHOD AND APPARATUS FOR DETERMINING MALPOSITION OF VERTEBRAE

Herbert J. Horner, Dayton, Ohio

Application January 11, 1949, Serial No. 70,278

28 Claims. (Cl. 128—2)

This invention relates to a method and apparatus for determining malposition or incorrect position of the osseous or bonelike tissue of the human spinal column and pelvis by means of vibration, to render it possible to accurately determine any malposition of the pelvis or of vertebrae under investigation.

It is well known that malposition of vertebrae of the human spinal column is the cause of many ailments. Malposition of vertebrae produces abnormal pressure on various nerves, whereby the parts of the body served by that nerve respond as though affected by a local ailment in that part of the body, whereas the actual cause of the ailment is the malposition of the vertebrae rather than a local ailment indicated by the nerve response.

X-ray examination and palpation have been the only methods of determining malposition of vertebrae. However, even these are not accurate, for much analysis is left to the skill of the technician. X-ray analysis is not only dangerous because of the X-ray, but is slow and involves the taking of numerous pictures. An analysis by palpation is largely a matter of skill of the technician and much guesswork can be involved.

Many of the apparent ailments in local areas of the human body can be traced to the malposition of vertebrae in the cervical, thoracic, lumbar, sacrum or coccyx areas. In a normal, healthy person the vertebrae of the spinal column are all aligned along an imaginary median line that bisects the human body from top to bottom. The vertebrae all lay in parallel planes with the transverse processes or side projections in vertical arrangement. The spinous processes or rear projections are also in vertical arrangement.

It is, therefore, an object of this invention to provide a method and apparatus by which an accurate analysis can be made of malposition of vertebrae to determine any angular misplacement of any of the vertebrae about a vertical axis or to determine any lateral displacement, either sideways of the human body or forwardly or rearwardly thereof from a normal position, and which apparatus and method will give an immediate accurate result of indicating any such malposition. After determination of any malposition of vertebrae, proper steps can be taken to return the vertebrae to normal position in the spinal column.

Still another object of the invention is to provide a method and apparatus for indicating angular displacement of vertebrae relative to either a horizontal or vertical axis or any lateral displacement of vertebrae from a vertical axis by the transmission of audible signals through the spinal column, which will be reflected from the transverse processes or spinous process of the vertebrae or any other projection, to permit comparison of signal intensity from opposite processes or projections of a vertebra under investigation, whereby to indicate accurately the vertical or horizontal angular position or lateral displacement of the vertebra relative to vertebrae on either side of the one under consideration.

Still another object of the invention is to provide a method and apparatus for indicating accurately the angular misplacement or lateral displacement of vertebrae by the use of a bubble level and a compass so arranged with respect to a pair of sound receivers, that are connected with a sound intensity indicating apparatus, that displacement of the sound receivers relative to a vertebra under investigation will cause the sound signals to be received in the sound receivers of varying signal strength from the transverse or the spinous process to indicate the locations of the processes and therefore angular misplacement or lateral displacement of the vertebra, the bubble level indicating angular misplacement relative to a horizontal plane and the compass indicating angular misplacement about a vertical axis through the spinal column.

Further objects and advantages will become apparent from the drawings and the following description.

In the drawings:

Figure 1 is an elevational view illustrating the apparatus of this invention.

Figure 2 is an enlarged cross-sectional view taken along line 2—2 of Figure 1.

Figure 3 is a perspective view of an auditory signal producing device.

Figures 4 and 5 are diagrammatic views illustrating the use of the apparatus of Figure 1.

Figure 6 is a cross-section taken along line 6—6 of Figure 1.

Figure 7 is an elevational view of a right-angle sound receiver for investigating vertebrae in the thoracic, lumbar, sacrum or coccyx areas.

The sound receiving and indicating apparatus consists of a pair of sound receivers or listening-posts 10 and 11 that are adapted for placement at opposite sides of a vertebra that is under investigation, as for example the cervical vertebra 12.

The sound receivers 10 and 11 may merely be enlargements at the end of sound transmitting tubes 13 and 14, respectively, or they may be individual cone-shaped devices, such as illustrated in Figure 2. Preferably, the sound receivers or listening-posts are adjustable on the tubes 13 and 14, respectively, for proper adjustment between them when placed against the neck or back of a patient, suitable ball-joints 10a and 11a being provided to adjust the receivers on the contour of the neck of a patient, or as shown in Figure 7, a right-angle sound receiver 50 may be provided for investigating fleshy areas of the back of a patient, a suitable ball-joint 50a being provided to adjust the receiver 50 on the contour of the back of the patient.

The sound receiving tubes 13 and 14 are hollow so that the sound received by the receivers 10 and 11 can be transmitted through said tubes 13 and 14 to a sound-receiving apparatus 15. The tubes 13 and 14 are flexibly rigid in the usual manner of stethoscope tubes. Flexible tubes 13a and 14a connect to the tubes 13 and 14 respectively and join into a common flexible tube 55 that leads to a diaphragm 56 positioned adjacent the pick-up microphone 16. The tubes can be held in adjusted position relative to each other by a link 57 that has the loops 58 engaging the serrations 59 on the tubes 13 and 14.

Sounds transmitted through either of the tubes 13 and 14 are picked up by a microphone 16 located in a soundproof compartment of an electronic amplifying apparatus 17 which may be connected to a visual indicator meter 18 or a loudspeaker 19 for amplifying and indicating the intensity of the sound received through the tubes 13 and 14 for comparison by the doctor.

A bubble level 20 is secured onto the tubes 13 and 14 in any suitable manner. The vial containing the liquid which forms the bubble 20a should have its longitudinal axis parallel to a common axis between the sound receivers 10 and 11, and the rotative axis of the bubble level 20 should be normal to the common axis between the sound receivers 10 and 11, whereby tilting of the sound receivers 10 and 11 relative to a horizontal plane will cause longitudinal movement of the bubble 20a in the bubble level to indicate the degree of angular displacement of the common axis between the sound receivers relative to a horizontal plane.

A compass 25 is also carried by the tubes 13 and 14 for the purpose of indicating the rotative position of the sound receivers relative to a vertical axis whereby to indicate the angular displacement of the common axis between the sound receivers about the vertical axis. The compass 25 has its axis of rotation normal to the common axis between the sound receivers 10 and 11 and to the rotative axis of the bubble level 20.

The compass 25 may be carried in a bezel 26 for rotation to set the compass arrow 28 in an initial set position, pointing to "N," whereafter rotation of the entire device in a horizontal plane will indicate angular deflection of the common axis between the sound receivers about a vertical axis.

It will thus be seen that if the detecting device shown in Figure 1 is held in a horizontal position, with the arrow of the compass initially set pointing toward the point "N," and with the bubble in the bubble level centered longitudinally of the level, any deflection of the sound receivers 10 and 11, either about a horizontal axis or a vertical axis, will be indicated accurately by the bubble level 20 and the compass 25 as a result of movement of the bubble in the level or the arrow of the compass.

To use the apparatus of this invention, it is necessary to produce a sound stimulus in the vertebral column of the human body. Thus, in Fig. 3, there is illustrated an auditory signal-producing device which consists of an electrically actuated vibrator 30 carried on an elastic belt or strap 31. The belt 31 is made of elastic material so that it may stretch with normal body movements to maintain the signal producing device against the body with a uniform pressure and thereby prevent variation in intensity or signal strength transmitted to the bone like tissue of the body. Any device suitable for producing a vibration in the auditory range can be satisfactorily used.

The apparatus of this invention is adapted to establish the angular misplacement or lateral displacement of vertebrae from their normal position in the spinal column. For example, as shown in Figure 5, Atlas, represented by A, carries the skull C, and axis B carries Atlas A. The cervical vertebrae, as do all vertebrae, have transverse processes 40 and 41, as illustrated on Atlas A. When a vibration is referred to Atlas, the vibration will be distributed throughout its structure and therefore to its lateralmost tips or transverse processes. These transverse processes 40 and 41 approach both sides of the neck of the human body, as illustrated in Figure 1. All parts of any vertebra that are reasonably close to the surface afford points of examination. The lateral, or side, and posterior, or rear, parts of such vertebrae are available for this purpose whereas the anterior processes facing the front of the body and therefore its greater width, would be unavailable. The transverse processes, articulating surfaces, lamina, pedicles, spinous processes and in some cases the lateral portions of the body of vertebrae are intended to be points of consideration.

Thus, if the sound receivers 10 and 11 are positioned in the known location of the transverse processes of Atlas, vibration transmitted from the processes 40 and 41 will be picked up by the sound receivers 10 and 11 and will be transmitted to the sound receiving apparatus 15 through the tubes 13 and 14 for indication of the intensity of the sound received by either the meter 18 or the loud speaker 19, or both.

The doctor in analyzing the position of the vertebrae will, for example, place the sound receivers 10 and 11 at opposite sides of Atlas A as shown in Figure 1. He will then pinch off either flexible tube 13a or 14a with his fingers, or suitable clamps can be provided for this purpose, whereby to selectively stop the transmission of sound to the sound receiving apparatus from either of the sound receivers or listening-posts 10 and 11.

By alternately pinching off the tubes 13a and 14a, and by viewing the meter 18 or listening to the speaker 19, the doctor can determine the comparative intensity of sound received in the sound receivers or listening posts 10 and 11, respectively.

At the start of an examination, of vertebrae in the neck area of the patient, which procedure is illustrated in Figure 1, the instrument is placed in the position shown in Figure 1 relative to the neck of the patient with the receivers or listening posts 10 and 11 disposed at opposite sides of the patient's neck. The instrument is held so that the tubes 13 and 14, which are similar to stethoscope tubes, are disposed in a horizontal plane, thus positioning the bubble 20a of the bubble level 20 in its mid position in the level, as illustrated in Figure 1 and the compass 25 is adjusted so that the compass arrow 28, will, for example, point to "N."

The doctor will then move the listening posts, for example, vertically up and down on the patient's neck or rotate the instrument on a horizontal axis that extends through the patient's neck with the listening posts 10 and 11 thus moving in the area of the assumed position of the process 41, for example, and will also move the listening post 11 forward and backward over the patient's neck by rotating the instrument on an axis extending vertically through the patient's neck, at all times listening to the sound received through the sound receiving apparatus 15, and watching the meter 18 to determine when the sound is received at its maximum intensity. When the maximum of intensity of sound is received, as indicated by hearing the sound, or by visual inspection of the meter 18, the doctor will know that the listening post 11 is in direct alignment with the process 41 since the maximum intensity of sound will be received only when the listening post 11 is at its nearest position relative to the process 41.

The doctor will then hold the listening post 11 stationary on the patient's neck at the position at which the maximum intensity of sound is received from the process 41 and will then move the sound receiver, or listening post 10 up and down over the patient's neck and back and forth and forward and backward over the same in the same manner as the listening post 11. At this time the doctor will pinch off tube 14a so that the sound will not be received through the sound conducting tube 14, but rather sound will now be received through the tube 13. When maximum intensity of sound is received through the tube 13, the doctor will then know that the listening post 10 is at its nearest position adjacent process 40, thus establishing positive positions of the processes 40 and 41 in the patient's body.

If the vertebra 12 is in a normal position in the spinal column, the bubble 20a of the level 20 will be at its center position as illustrated in Figure 1 and the arrow 28 of the compass 25 will be pointed to "N," as the instrument was initially positioned relative to the patient's body. With the bubble 20a and the arrow 28 in their normal positions, as at the start of the examination, this will indicate to the doctor that the vertebra 12 is in its normal position, and there is no misplacement of this vertebra relative to other vertebrae in the spinal column in the patient's body.

However, if the bubble 20a has moved from its center position, as illustrated in Figure 1 toward either end of the bubble level 20, this will immediately indicate to the doctor that the vertebra 12 is misplaced from a direct horizontal plane, which it should normally assume, and the degree of movement of the bubble 20a in the level 20 from its mid position will indicate to the doctor the exact angular degree of deflection of the vertebra 12 from its normal horizontal position, the indices on the bubble level being scaled off in degrees. It will be apparent that the bubble level 20 is a very sensitive instrument to indicate misplacement of objects from a horizontal plane, since the bubble level is a device in which the bubble will only be at its mid position if it is disposed in a direct horizontal plane.

Similarly, after the doctor has made his exploratory search as previously described to locate the exact position of the processes 40 and 41 by listening to the maximum intensity of sound received from these processes as previously described, the doctor will also inspect the position of the arrow on the compass 25. If the arrow 28 is in its normal position pointing toward "N" at which it was set at the beginning of the examination, the doctor will know that the vertebra 12 is in its normal position relative to the median line that bisects the body from front to rear, the processes 40 and 41 normally being positioned at right angles to the line that bisects the human body so that under normal condition the arrow 28 will point directly at the imaginary median line that bisects the human body.

However, should the arrow 28 swing to either side of its initially set position, it will immediately indicate to the doctor that the vertebrae 12 has rotated on its axis represented by the axis of the spinal column. The degree of deflection of the arrow 28 to one side or the other of its initial position will indicate the degree of rotation of the vertebra 12 about its vertical axes since the compass is marked off in degrees.

The position of the transverse or side processes of the vertebra 12 can be compared with the transverse or side processes of the vertebra immediately above and below the vertebra 12 and readings taken of the bubble 20a and the compass 25 in accordance with the procedure described heretofore, so that a comparison can be made of the position of the transverse processes of the various vertebrae one with the other to locate the vertebra that is malpositioned in the spinal column.

Having found the vertebra that is malpositioned the doctor can then proceed with manual manipulation to place the malpositioned vertebra into its correct position and thus overcome the patient's difficulty. The doctor having manipulated the vertebra to what he believes to be the correct position, can immediately check the results of his manipulation by again using the instrument in the manner heretofore described and comparing the position of the vertebra that has been manipulated with those above and below it. This procedure can be followed until the vertebra is placed into its correct position relative to others in the spinal column.

It will of course be understood that if more than one vertebra is malpositioned their position can also be determined in the manner heretofore described and corrected by proper manual manipulation and the correction checked before the patient leaves the doctor's office.

Since many of the normal elements of the human body can be traced to malpositioned vertebrae in the spinal column, the doctor, by the use of the instrument of this invention, will be enabled to insure correct positioning of the vertebrae before the patient leaves his office rather than following the existing practice of making a manual manipulation correction by mere feel and then waiting for the patient to report on his physical condition several days later.

The sound stimulus for transmission to the vertebral column can be produced in any bone having continuity, either direct or indirect, with the spinal column. Thus, in Figure 4 the auditory signal-producing device 30 is illustrated as being applied to the body directly at the spinal column. However, the sound stimulus can be produced in the spinal column by placing the signal device 30 at the sternum or breast-bone, and in this instance the added advantage will be had that the vibration will be amplified by the thoracic cavity and its contents.

While the invention has been heretofore described with reference to the investigation of vertebrae in the cervical area, yet the vertebrae in the thoracic, lumbar, sacral and coccygeal areas can also be investigated. In this instance, the right angular sound receiver 50, illustrated in Fig. 7, is substituted for each of the sound receivers 10 and 11 illustrated in Figure 1. Thus, the sound receivers will both point in the same direction toward the patient on parallel axes that are normal to the region of the back of the patient.

There are conditions under which the vertebra 12 is malpositioned merely in a sidewise direction rather than being misplaced angularly relative to a horizontal plane or rotative about the axis of the vertebra hereinbefore described.

Under these conditions examination of the vertebra 12 in the manner hereinbefore described will cause the instrument to assume the position illustrated in Figure 1 with the bubble 20a at its normal mid position and with the compass arrow 28 at its normal position pointing at "N." Under this condition the doctor will note that the bubble level and compass are both in their normal positions, but under the condition wherein the vertebra 12 has merely moved directly in sidewise direction either left or right of the patient's neck, process 41, for example, will be closer to the listening post 11 than the process 40 is to the listening post 10, assuming the vertebra 12 has side-slipped in a rightward position as viewed in Figure 1. Under this condition the sound received through the sound conductor 14 will be of a greater intensity than the sound transmitted through the sound conductor 13, the doctor alternately pinching off tubes 14a and 13a to compare the intensity of sound received through the tubes 14 and 13 respectively. The greater intensity of sound received through the tube 14 indicates to the doctor that the vertebra 12 has side-slipped in a rightward direction as viewed in Figure 1 but is in its normal horizontal position since the bubble of the bubble level 20 and the arrow of the compass 25 are in their normal position. Having found this condition existing the doctor can manipulate the vertebra in the leftward direction to place it in its correct position in the spinal column and then check his manipulation by again comparing the sound intensity that is received from the processes 40 and 41. When the intensity of the sound received through the tubes 13 and 14 as alternately compared, is of equal value the doctor will know that he has manipulated the vertebra 12 to its correct position centralized with other vertebrae in the spinal column.

In the region of the back of a patient, from the shoulder to the hip area, that is in the thoracic, lumbar, sacral and coccygeal areas, it will be obvious that placement of the sound receivers 10 and 11 at the left and right sides of a patient's body would place the sound receivers too distant from the processes of the spinal column to receive a satisfactory sound stimulus. Thus, to investigate the individual vertebra in the spinal column in the region of the back of a patient, the sound receivers 10 and 11 are replaced with a sound receiver such as that indicated in Figure 7 so that the sound receiver 50 will be at right angles to the tube 14, as illustrated in Figure 7. Similarly, a like sound receiver is attached to the tube 13. Thus, the sound receivers on the tubes 13 and 14 will then have their axes parallel to one another with the sound receiving openings of the sound receivers both pointed in the same direction so that they can both be placed against the back of a patient simultaneously. The sound receivers on the tubes 13 and 14 will at this time be placed at opposite sides of the imaginary median line that bisects the human body so that one sound receiver will be adjacent the transverse processes on the left side of the vertebra and the other sound receiver will be adjacent the transverse processes on the right side of the vertebra.

At the start of an investigation of the suspected malpositioned vertebra in the spinal column in the area of the back of a patient, the sound receivers 50 will be placed against the back of the patient in the manner heretofore described and the instrument will be leveled to a horizontal plane so that the bubble 20a of the bubble level 20 will be disposed in its mid position as illustrated in Figure 1. The compass arrow 28 will be positioned so that it points at "N," and also will be in direct alignment with the imaginary median line that bisects the human body from front to rear, thus pointing immediately at the center of the back of a patient.

With the instrument so positioned, the doctor will pinch off tubes 13a and 14a alternately to listen to the intensity of sound received from the transverse processes of the vertebra under investigation. If the intensity of sound received from each of the transverse or side processes of the vertebra is identical, and the bubble 20a remains in its mid position and the compass arrow 28 remains pointed at the center of the back of a patient, the doctor will know that the vertebra under investigation is in its proper position laterally of the patient's body.

However, if the sound stimulus received from the transverse processes should be dissimilar, the doctor can then move the instrument to the right or to the left of the patient's body until identical stimulus is received from each of the transverse processes of the vertebra under investigation. The degree of movement to the right or left of a patient's body would indicate the degree of lateral slip of the vertebra that is under investigation. This can be noted by the fact that the compass arrow will no longer be pointed in the immediate center of the patient's back, and the amount that it is to the left or right of the center of the patient's back will indicate the amount of side-slip of the vertebra to either left or right.

Further, if the sound stimuli received from each of the transverse processes of the vertebrae under investigation in the back area of the patient are not the same when the instrument is in a horizontal position with the arrow 28 of the compass pointed at the center of the patient's back, the doctor can also investigate whether the vertebra under investigation is misplaced angularly from a horizontal plane by moving the sound receivers up and down over the patient's back until the sound stimulus received through each of the sound receivers 50 is identical. The angular displacement of the instrument from a direct horizontal plane will be indicated by the position of the bubble 20a of the bubble level 20 by moving either to left or right of its mid position, and the degree of angular displacement will be indicated by the degree of the movement of the bubble from its mid position.

Having made an instrument determination of the malpositioned vertebra, the doctor can then manually manipulate the vertebra to return it to its normal position, and then can check the manual manipulation by again determining the position of the processes in the manner heretofore described. This process can be repeated until full correction is made.

While the method and apparatus disclosed and described herein illustrate a preferred form of invention, yet it will be understood that modifications can be made without departing from the spirit of the invention, and that modifications that fall within the scope of the appended claims are intended to be included herein.

Having thus fully described my invention, what I claim as new and desire to secure by Letters Patent is:

1. Apparatus for determining malposition of a vertebra of the vertebral column including, a pair of sound receivers, mechanism for indicating rotative positions of said sound receivers relative to a vertical and a horizontal axis and including means fixedly connecting said sound receivers with said mechanism, means for conducting an auditory signal from said sound receivers, and indicating means operatively connected with said conducting means to indicate the intensity of the auditory signals conducted by said conducting means.

2. Apparatus for determining malposition of a vertebra of the vertebral column including, a pair of sound receivers, apparatus for indicating the rotative positions of said sound receivers relative to a vertical and a horizontal axis, means for conducting an auditory signal from said sound receivers, and electrical apparatus operatively connected with said conducting means for indicating the intensity of the auditory signal.

3. Apparatus for determining malposition of the vertebrae of the vertebral column including, a pair of sound receivers, a level connected with said sound receivers for indicating the rotative position of said receivers relative to a horizontal axis, a compass operatively connected with said sound receivers for indicating the rotative position of said receivers relative to a vertical axis, means for conducting an auditory signal from said sound receivers, and means connected with said conducting means for indicating the intensity of the auditory signal conducted by the said conducting means.

4. Apparatus for determining malposition of a vertebra of the vertebral column including, a pair of sound receiving tubes connected together at a common juncture and having their sound receiving ends positioned in a common plane and equidistant from the said juncture, a level indicating apparatus operatively connected with said sound receivers for indicating the position thereof relative to a true horizontal plane, a second indicating apparatus operatively connected with said sound receivers for indicating the rotative position thereof about a vertical axis, means for conducting an auditory signal from said sound receiving tubes, and means operatively connected with said conducting means for indicating the intensity of the auditory signal received from the sound receivers.

5. Apparatus for determining malposition of a vertebra of the vertebral column including, a pair of sound receiving tubes connected together at a common juncture and having their sound receiving ends positioned in a common plane and equidistant from the said juncture, a level indicating apparatus operatively connected with said sound receivers for indicating the position thereof relative to a true horizontal plane, a second indicating apparatus operatively connected with said sound receivers for indicating the rotative position thereof about a vertical axis, means for controllable conduction of an auditory signal from each of said sound receiving tubes, and means operatively connected with said conducting means for indicating the intensity of the auditory signal received from the sound receivers.

6. Apparatus for determining malposition of a vertebra of the vertebral column including, a pair of sound receiving tubes connected together at a common juncture and having their sound receiving ends positioned in a common plane and equidistant from the said juncture, a level indicating apparatus operatively connected with said sound receivers for indicating the position thereof relative to a true horizontal plane, a second indicating apparatus operatively connected with said sound receivers for indicating the rotative position thereof about a vertical axis, means for separate controlled conduction of an auditory signal from each of said sound receiving tubes, and means operatively connected with said conducting means for indicating the intensity of the auditory signal received from the sound receivers.

7. Apparatus for determining malposition of a vertebra of the vertebral column including, a pair of rigid sound receiving tubes adjustable relative to each other connected together at a common juncture and having their sound receiving ends positioned in a common plane and equidistant from the said juncture, mechanism for indicating rotative positions of said tubes about a horizontal axis and a vertical axis, means connecting said mechanism with said sound receiving tubes for establishing the position thereof relative to a horizontal and vertical indicating axis of the said indicating mechanism, means for conducting auditory signals from said sound receivers, and indicating means operatively connected with said conducting means for receiving the auditory signals therefrom and indicating the intensity thereof.

8. Apparatus for determining malposition of a vertebra of the vertebral column including, a pair of rigid sound receiving tubes flexibly arranged and connected together at a common juncture and having their sound receiving ends positioned in a common plane and equidistant from the said juncture, means connecting a level indicating device with said tubes to indicate the degree of angular change of said common plane relative to the horizontal, a second indicating device for indicating rotative positions of said tubes about a vertical axis operatively connected with said tubes with the axis of the said second device normal to said common plane of said tubes, whereby to indicate the rotative position of said tubes about a vertical axis passing through said common plane, means for controllable conduction of an auditory signal from each of said tubes, and apparatus for receiving the auditory signals from said tubes to indicate the intensity thereof relative to each other.

9. Apparatus for determining malposition of a vertebra of the vertebral column including, a pair of rigid sound receiving tubes flexibly arranged and connected together at a common juncture and having their sound receiving ends positioned in a common plane and equidistant from the said juncture, means connecting a level indicating device with said tubes to indicate the degree of angular change of said common plane relative to the horizontal, a second indicating device for indicating rotative positions of said tubes about a vertical axis operatively connected with said tubes, means for controllable conduction of an auditory signal from each of said tubes, and apparatus for receiving the auditory signals from said tubes to indicate the intensity thereof relative to each other.

10. Apparatus for determining malposition of a vertebra of the vertebral column including, a pair of rigid auditory signal transmitting tubes adjustable relative to each other and connected together at a common juncture, a sound receiver positioned at the end of each of said tubes positioned in a common plane and equidistant from said juncture, a level indicating device carried by said tubes with the rotative indicating axis thereof positioned parallel to said plane, a second indicating apparatus carried by said tubes for indicating rotative positions about a vertical axis, the axis of said last-mentioned device being positioned normal to said plane, and a sound receiver operatively connected with said tubes for indicating the intensity of the auditory signal transmitted therethrough.

11. Apparatus for determining malposition of a vertebra of the vertebral column including, a pair of sound receiving tubes connected together at a common juncture and having their sound receiving ends positioned in a common plane and equidistant from the said juncture, a bubble level operatively connected with said tubes for indicating the rotative position thereof about a horizontal axis, and means for conducting an auditory signal from said tubes.

12. Apparatus for determining malposition of a vertebra of the vertebral column including, a pair of sound receiving tubes connected together at a common juncture and having their sound receiving ends positioned in a common plane and equidistant from the said juncture, a bubble level operatively connected with said tubes for indicating the rotative position thereof about a horizontal axis, and controllable means for conducting separately an auditory signal from each of said tubes.

13. Apparatus for determining malposition of the vertebra of the vertebral column including, a pair of sound receivers, a level connected with said sound receivers for indicating the rotative position of said receivers relative to a horizontal axis, a compass operatively connected with said sound receivers for indicating the rotative position of said receivers relative to a vertical axis, and means for conducting an auditory signal from each of said sound receivers.

14. Apparatus for determining malposition of a vertebra of the vertebral column including, a pair of sound receivers positioned on a common axis, mechanism for indicating rotative positions of said receivers about a horizontal axis and a vertical axis, rigid means connecting said mechanism with said sound receivers to position the common axis normal to the horizontal and vertical indicating axes of the said indicating mechanism, and means for conducting auditory signals from said sound receivers.

15. Apparatus for determining malposition of a vertebra of the vertebral column including, a pair of sound receivers, apparatus for indicating rotative positions of said sound receivers relative to a vertical and a horizontal axis and including means connecting said sound receivers thereto, means for conducting an auditory signal from said sound receivers, indicating means operatively connected with said conducting means to indicate the intensity of the auditory signals conducted by said conducting means, and a signal producing device for operative association with said sound receivers for establishing an auditory sound adapted to be picked up by said receivers.

16. Apparatus for determining malposition of the vertebrae of the vertebral column including, a pair of sound receivers, a level connected with said sound receivers for indicating the rotative position of said receivers relative to a horizontal axis, a compass operatively connected with said sound receivers for indicating the rotative position of said receivers relative to a vertical axis, means for conducting an auditory signal from said sound receivers, means connected with said conducting means for indicating the intensity of the auditory signal conducted by the said conducting means, and a signal producing device having flexible means for removably attaching the same to a human body for operative association with said sound receivers for establishing an auditory sound adapted to be picked up by said receivers.

17. The method of determining malposition of vertebrae of the vertebral column comprising, applying an auditory signal to the human body of sufficient intensity for transmission of the signal through the vertebral column, establishing listening posts adjacent similar and opposite paired points of the osseous tissue to be investigated whereby to receive the auditory signal therefrom, and comparing the intensity of the auditory signal received from each of the paired points of the osseous tissue under investigation whereby to establish malposition of the same.

18. The method of determining malposition of vertebrae of the vertebral column comprising, applying an auditory signal to the human body of sufficient intensity for transmission of the signal through the vertebral column, establishing listening posts adjacent opposite paired points on vertebrae to be investigated whereby to receive the auditory signal therefrom, and comparing the intensity of the auditory signal received from each of the said points of the vertebrae under investigation whereby to establish the malposition of the vertebrae.

19. The method of determining malposition of vertebrae of the vertebral column comprising, applying an auditory signal to the human body of sufficient intensity for transmission of the signal through the vertebral column, establishing listening posts adjacent similar and opposite processes of the vertebrae to be investigated whereby to receive the auditory signal therefrom, adjusting the listening posts anteriorly and posteriorly of the vertebral column and comparing the intensity of the auditory signal from each of the processes of the vertebrae under investigation whereby to establish anterior or posterior malposition of the vertebrae or of their processes.

20. The method of determining malposition of vertebrae of the vertebral column comprising, applying an auditory signal to the human body of sufficient intensity for transmission of the signal through the vertebral column, establishing listening posts adjacent similar and opposite processes of the vertebrae to be investigated whereby to receive the auditory signal therefrom, adjusting the listening posts inferiorly and superiorly of the vertebral column and comparing the intensity of the auditory signal from each of the transverse processes of the vertebrae under investigation whereby to establish inferior or superior malposition of the vertebrae or of their processes.

21. The method of determining malposition of vertebrae of the vertebral column comprising, applying an auditory signal to the human body of sufficient intensity for transmission of the signal through the vertebral column, establishing listening posts adjacent similar and opposite processes of the vertebrae to be investigated whereby to receive the auditory signal therefrom, receiving separately the auditory signal from each of opposite processes and comparing the intensity of the auditory signal from each of the processes of the vertebrae under investigation whereby to establish lateral malposition of the vertebrae relative to the median line of the human body.

22. The method of determining malposition of vertebrae of the vertebral column particularly in the cervical area comprising, applying an auditory signal to the vertebral column of sufficient intensity for transmission of the signal therethrough, establishing listening posts adjacent similar and opposite paired parts of the vertebrae to be investigated whereby to receive the auditory signal therefrom, adjusting the listening posts superiorly and inferiorly of the vertebral column and comparing the intensity of the auditory signal from each of the paired parts of the vertebrae under investigation whereby to establish superior or inferior malposition of the vertebrae.

23. The method of determining malposition of vertebrae of the vertebral column particularly in the cervical area comprising, applying an auditory signal to the vertebral column of sufficient intensity for transmission of the signal therethrough, establishing listening posts adjacent opposite transverse processes of the vertebrae to be investigated whereby to receive the auditory signal therefrom, adjusting the listening posts superiorly and inferiorly from an anterior or posterior position of a transverse process of a vertebra under investigation in the vertebral column and comparing the intensity of the auditory signal from each of the transverse processes of the vertebrae whereby to establish superior or inferior malposition of the vertebrae in the anterior or posterior malposition of the transverse process of the vertebrae.

24. The method of determining malposition of vertebrae of the vertebral column comprising, applying an auditory signal to the vertebral column of sufficient intensity for transmission of the signal therethrough, establishing listening posts adjacent similar and opposite processes or paired parts of the vertebra to be investigated whereby to receive the auditory signal therefrom, and comparing the intensity of the auditory signal from each of the said processes or paired parts of the vertebra under investigation whereby to establish angular and/or lateral malposition of the vertebra.

25. The method of determining malposition of vertebrae of the vertebral column comprising, applying an auditory signal to the human body of sufficient intensity for transmission of the signal through the vertebral column, establishing a listening post adjacent processes of the vertebrae to be investigated selectively whereby to receive selectively the auditory signal therefrom, establishing a connection from the listening post to a level indicating device whereby to move the level indicating device concurrently with the listening post, and adjusting the listening post superiorly and inferiorly relative to the processes of a vertebra under investigation and selectively comparing the intensity of the auditory signal from the processes until substantial uniformity of intensity of signal strength is received from each of the processes whereby to establish the degree of superiority or inferiority of the processes of the vertebrae relative to a horizontal axis.

26. The method of determining malposition of vertebrae of the vertebral column comprising, applying an auditory signal to the human body of sufficient intensity for transmission of the signal through the vertebral column, establishing a listening post adjacent processes of the vertebra to be investigated selectively whereby to receive the auditory signal therefrom, establishing a connection from the listening post to a compass-type indicating device whereby to move the compass type indicating device concurrently with the listening post, and adjusting the listening post transversely of the processes of a vertebra under investigation and comparing the intensity of the auditory signal selectively from each of the processes until substantial uniformity of intensity of signal strength is received from each of the processes whereby to establish the degree of malposition of the processes of the vertebrae relative to the vertical axis of the vertebral column.

27. The method of determining malposition of vertebrae of the vertebral column particularly in the cervical area comprising, applying an auditory signal to the vertebral column of sufficient intensity for transmission of the signal therethrough, establishing listening posts adjacent similar and opposite processes of the vertebrae to be investigated whereby to receive the auditory signal therefrom, transmitting the auditory signal from each of the said processes of the vertebrae to an indicating apparatus whereby to indicate the intensity of the auditory signal received from each of the said processes of the vertebrae, adjusting the listening posts relative to the said processes of the vertebrae and comparing the intensity of the auditory signal received from each of the points of examination until the signal strength received from each of the processes is substantially the same whereby to position the listening posts in axial alignment with the said processes of the vertebrae and to establish malposition of the vertebrae.

28. The method of determining malposition of the vertebral column particularly in the cervical area comprising, applying an auditory signal to the vertebral column of sufficient intensity for transmission of the signal therethrough, establishing listening posts adjacent opposite paired processes of the vertebrae to be investigated whereby to receive the auditory signal therefrom, transmitting the auditory signal from each of said processes of the vertebrae to an electronically controlled visual indicating meter whereby to indicate visually the intensity of the auditory signal received from each of the examined processes of the vertebrae, adjusting the listening posts relative to the said processes of the vertebrae, and comparing the intensity of the auditory signal received from each of the paired processes until the signal strength received from each of the said processes is substantially the same whereby to position the listening posts in axial alignment with the said processes of the vertebrae to establish malposition of the vertebrae.

HERBERT J. HORNER.

REFERENCES CITED

The following references are of record in the file of this patent:

UNITED STATES PATENTS

| Number | Name | Date |
|---|---|---|
| 1,552,284 | Evins | Sept. 1, 1925 |
| 1,648,899 | Hayman | Nov. 15, 1927 |
| 1,648,939 | Evins | Nov. 15, 1927 |
| 2,008,295 | Smith | July 16, 1935 |
| 2,161,370 | Mears | June 6, 1939 |